United States Patent
Lee et al.

(10) Patent No.: US 9,088,911 B2
(45) Date of Patent: Jul. 21, 2015

(54) METHOD AND APPARATUS FOR CHANNEL SCANNING IN A WIRELESS COMMUNICATION SYSTEM

(75) Inventors: Hyun-Chul Lee, Osan-si (KR); Jin-Woo Jeon, Suwon-si (KR); Young-Seop Han, Daeugu (KR); Young-Jip Kim, Suwon-si (KR); Hee-Yong Youn, Seongnam-si (KR); Kyung-Tae Kim, Suwon-si (KR)

(73) Assignees: Samsung Electronics Co., Ltd., Suwon-Si (KR); Sungkyunkwan University Foundation for Corporate Collaboration, Suwon-Si (KR)

( * ) Notice: Subject to any disclaimer, the term of this patent is extended or adjusted under 35 U.S.C. 154(b) by 1043 days.

(21) Appl. No.: 13/078,794

(22) Filed: Apr. 1, 2011

(65) Prior Publication Data

US 2011/0243013 A1    Oct. 6, 2011

(30) Foreign Application Priority Data

Apr. 2, 2010   (KR) ........................ 10-2010-0030409

(51) Int. Cl.
| | |
|---|---|
| H04W 36/30 | (2009.01) |
| H04W 24/10 | (2009.01) |
| H04W 36/00 | (2009.01) |
| H04W 84/12 | (2009.01) |

(52) U.S. Cl.
CPC .......... *H04W 24/10* (2013.01); *H04W 36/0083* (2013.01); *H04W 36/30* (2013.01); *H04W 84/12* (2013.01)

(58) Field of Classification Search
CPC .................... H04W 36/0055; H04W 82/0206; H04W 36/0083
See application file for complete search history.

(56) References Cited

U.S. PATENT DOCUMENTS

| | | | | |
|---|---|---|---|---|
| 7,020,438 | B2 * | 3/2006 | Sinivaara et al. | 455/41.2 |
| 7,558,544 | B2 * | 7/2009 | Kim et al. | 455/132 |
| 7,596,194 | B2 * | 9/2009 | Janky | 375/346 |
| 7,774,000 | B2 * | 8/2010 | Kezys | 455/453 |
| 8,089,939 | B1 * | 1/2012 | Mater et al. | 370/332 |
| 8,144,673 | B2 * | 3/2012 | Alizadeh-Shabdiz | 370/338 |
| 2008/0008117 | A1 * | 1/2008 | Alizadeh-Shabdiz | 370/328 |
| 2008/0298249 | A1 * | 12/2008 | Baker et al. | 370/238 |
| 2010/0303051 | A1 * | 12/2010 | Umeuchi et al. | 370/338 |
| 2011/0165873 | A1 * | 7/2011 | Gidvani | 455/434 |

* cited by examiner

*Primary Examiner* — Hassan Kizou
*Assistant Examiner* — Roberta A Shand (57) ABSTRACT

A method and apparatus perform channel scanning in a wireless communication system. A signal intensity of an Access Point (AP) is compared with a scanning threshold, when the AP signal intensity not less than the scanning threshold, a channel scanning schedule list is generated in consideration of a scan time based on a passive channel scan scheme and a scan time based on an active channel scan scheme. The channel scanning is performed every channel scanning time, according to the channel scanning schedule list.

22 Claims, 10 Drawing Sheets

| AP ID | CH # | t_pas |
|---|---|---|
| AP 3 | 6 | 12 |
| AP 5 | 5 | 61 |
| AP 6 | 5 | 66 |
| AP 7 | 4 | 73 |
| AP 1 | 5 | 84 |
| AP 4 | 11 | 88 |
| AP 2 | 11 | 92 |

| Sc-time | Curr-time | |
|---|---|---|
| 12 | 12 | PASSIVE |
| 30 | 42 | ACTIVE |
| 0 | 42 | ACTIVE |
| 30 | 72 | ACTIVE |
| 0 | 72 | ACTIVE |
| 16 | 88 | PASSIVE |
| 4 | 92 | PASSIVE |

| | | |
|---|---|---|
| AP 1 | 5 | 84 |
| AP 4 | 11 | 88 |
| AP 2 | 11 | 92 |

MaxAP

MaxChannelTime = 30
Total_scantime = 92

METHOD AND APPARATUS FOR CHANNEL SCANNING IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Apr. 2, 2010 and assigned Serial No. 10-2010-0030409, the contents of which are incorporated herein by reference.

TECHNICAL FIELD OF THE INVENTION

The present invention relates to a method and apparatus for channel scanning in a wireless communication system. More particularly, the present invention relates to a method and apparatus for channel scanning in a user Mobile Station (MS) providing a Wireless Local Area Network (WLAN) based real-time multimedia service.

BACKGROUND OF THE INVENTION

In recent years, a demand for wireless networks has been increasing with the development of mobile communication technologies. Particularly, active research efforts for integrating a local wireless network based on the Institute of Electrical and Electronics Engineers (IEEE) 802.11 standard and a mobile communication network such as a Code Division Multiple Access (CDMA) network and a Universal Mobile Telecommunications System (UMTS) network are being made. The mobile communication network advantageously supports wide coverage and mobility, but enables only low speed transmission with a maximum of two megabits per second (Mbps). Compared to the mobile communication network (e.g., the CDMA/UMTS), the IEEE 802.11 local wireless network has a narrower service coverage, but enables only high-speed data transmission from eleven Mbps to a maximum of 54 Mbps. So, the two communication networks are efficiently integrated and provide wide coverage and high-speed data transmission for a seamless service to users.

However, when an IEEE 802.11 based wireless Mobile Station (MS) does handover, most of handover delays occur in a channel scanning step of searching a target Access Point (AP).

In the conventional channel scanning method, there are a passive scan scheme and an active scan scheme. The passive scan scheme is a scheme in which a wireless MS accesses all possible channels and waits for a beacon signal that is periodically transmitted through a corresponding channel from an AP. The active scan scheme is a scheme in which, after accessing each channel and transmitting a probe request frame, the wireless MS receives a probe response frame from an AP.

In the passive scan scheme, because the wireless MS accesses each channel and waits until a beacon signal is received from an AP, a separate control signal is not necessary, so an overhead is not generated. However, there is a disadvantage such that, when the wireless MS may not be synchronized when the beacon signal is transmitted from the AP, a considerable channel scanning delay is induced.

When the wireless MS cannot acquire previous information on an adjacent AP, the wireless MS should wait for a maximum of 100 milliseconds (ms) so as to receive a beacon signal from the AP for each channel. Because the wireless MS has to scan all channels supported in the IEEE 802.11 standard, when assuming that a local wireless network supports n channels, a delay time of 'n×beacon period' is needed. This considerable delay time may lead to a considerable degradation of Quality of Service (QoS) caused by delay time and packet loss, in an MS receiving a real-time data service.

In contrast, the active scan scheme is a technique in which, unlike the passive scan scheme, after accessing each channel, a wireless MS sends probe request messages and, during a constant wait time, receives probe response messages from all APs that are in operation in a corresponding channel. Because the wait time for the probe response message of the wireless MS is substantially shorter than the beacon period, the active scan scheme has an advantage that the delay time is significantly reduced. However, because the wireless MS directly broadcasts a probe request message for AP search, this induces an additional overhead. Also, there is a disadvantage in that channel traffic load increases if a plurality of wireless MSs send probe request messages.

Accordingly, there is a need for a method and apparatus for reducing a delay time resulting from channel scanning in a wireless communication system.

SUMMARY OF THE INVENTION

To address the above-discussed deficiencies of the prior art, it is a primary aspect of the present invention to solve at least the above-mentioned problems and/or disadvantages and to provide at least the advantages below. Accordingly, one aspect of the present invention is to provide a method and apparatus for channel scanning in a wireless communication system.

Another aspect of the present invention is to provide a method and apparatus for reducing a delay time resulting from channel scanning in a wireless communication system.

A further aspect of the present invention is to provide a method and apparatus for, when using an active scan scheme, minimizing an additional overhead and traffic load by channel in a wireless communication system.

The above aspects are achieved by providing a method and apparatus for channel scanning in a wireless communication system.

According to one aspect of the present invention, a method for channel scanning in a wireless communication system is provided. The method includes comparing a signal intensity of an Access Point (AP) with a scanning threshold. When the AP signal intensity not less than the scanning threshold, a channel scanning schedule list is generated in consideration of a scan time based on a passive channel scan scheme and a scan time based on an active channel scan scheme. And the channel scanning is performed every channel scanning time, according to the channel scanning schedule list.

According to another aspect of the present invention, an apparatus for channel scanning in a wireless communication system is provided. The apparatus includes a wireless Network Interface Card (NIC) and a controller. The wireless NIC compares a signal intensity of an Access Point (AP) with a scanning threshold. When the AP signal intensity not less than the scanning threshold, the controller generates a channel scanning schedule list in consideration of a scan time based on a passive channel scan scheme and a scan time based on an active channel scan scheme, and performs the channel scanning every channel scanning time according to the channel scanning schedule list.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain embodiments of the present invention will become more apparent from the following description taken in conjunction with the accompanying drawings in which.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure.

Preferred embodiments of the present invention will be described herein below with reference to the accompanying drawings. In the following description, well-known functions or constructions are not described in detail as they would obscure the invention in unnecessary detail. Terms described below, which are defined considering functions in the present invention, may be different depending on user and operator's intentions or practice. Therefore, the terms should be defined on the basis of the disclosure throughout this specification.

Below, embodiments of the present invention provide a method and apparatus for channel scanning in a wireless communication system.

Particularly, the present invention relates to a channel scanning technique for a wireless Mobile Station (MS) based on a Wireless Local Area Network (WLAN), and is a technique for providing an efficient real-time streaming service, by reducing, through preset scheduling, a delay time in a channel scanning operation upon handover.

The embodiments of the present invention provide an efficient channel scanning scheduling algorithm that uses scheduling capable of minimizing a scan time by each channel so as to reduce a channel scanning delay time caused by a WLAN handover, an interleaving technique for alternately executing channel scanning and data transmission/reception, and a technique for supporting a Quality of Service (QoS) for real-time data transmission such as a mobile Internet Protocol Television (IPTV) and such.

Also, a mechanism provided in the present invention sets the QoS requirements depending on the type of data being transmitted currently and in the past, and intermittently performs channel scanning within a range that satisfies the QoS requirements. For this purpose, the wireless MS performs the channel scanning after composing a schedule list that includes a record of an Access Point (AP) search sequence that consumes a minimum total channel scan time. The embodiments of the present invention may substantially reduce a delay time at handover occurrence and ensure a QoS at real-time data transmission, by setting a Channel Scanning Time (CST) and a Channel Scanning Interval (CSI) and alternately performing channel scanning and real-time transmission.

To describe the mechanism of the present invention, parameters are defined in Table 1 below.

TABLE 1

| Parameters | Definition |
|---|---|
| $T_{wait\_bcon}$ | Expected time for beacon transmission by each AP starting from $T_{next}$ |
| $T_{prevbcon}$ | Beacon reception time point at previous handover |
| $T_{next}$ | Starting time of next channel scanning |
| $\tau_p$ | Beacon signal period |
| $T_{\_sw}$ | Channel switching time |
| curr_scantime | Sum of current scan time for previous APs in scan schedule list |
| temp_curr_scantime | Sum of current scan time for previous APs in scan schedule list of re-arranged order |
| total_scantime | Total channel scan time |
| sc_time | Time for scan performance for each AP |
| maxAP | AP with a maximum t_pas value in scan schedule list |
| t_pas | Expected time for scanning AP by passive scanning |
| MaxChannelTime | Maximum wait time by channel of MS using active scanning |

Figure 1:
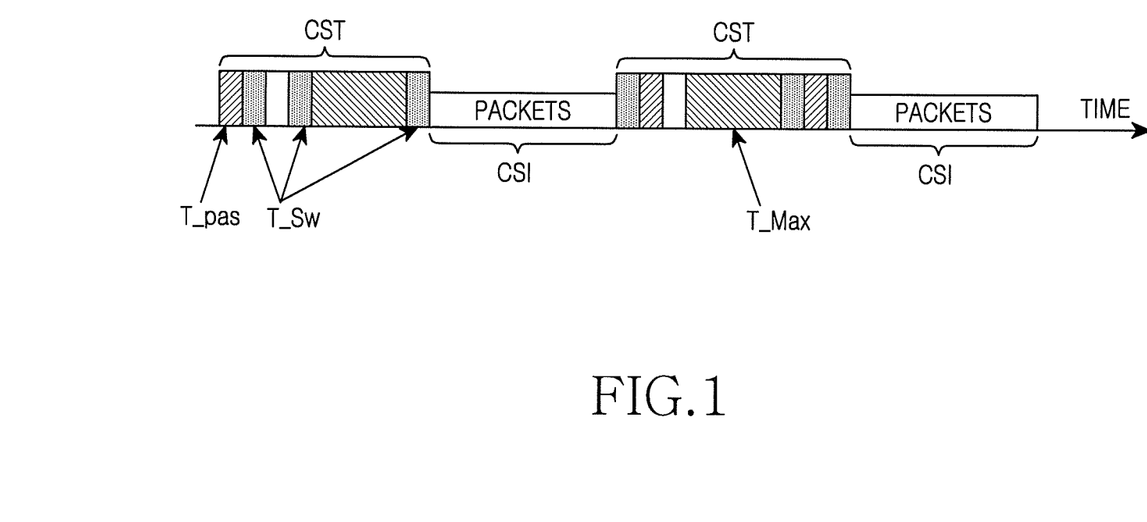
FIG. 1 is a diagram for defining parameters according to an embodiment of the present invention.

FIG. 1 is a diagram for defining parameters according to the present invention.

Referring to FIG. 1, the 't_pas' is an expected time for performing a passive scan for an AP channel, the 'T_sw' is a channel switching time, and the 'T_Max' is a time gap from beacon transmission to next beacon transmission. The CST is a time duration for which a wireless MS scans an AP channel, and the CSI is a duration between a current CST and a next CST and is a duration for which the wireless MS transmits packet data.

Figure 2:
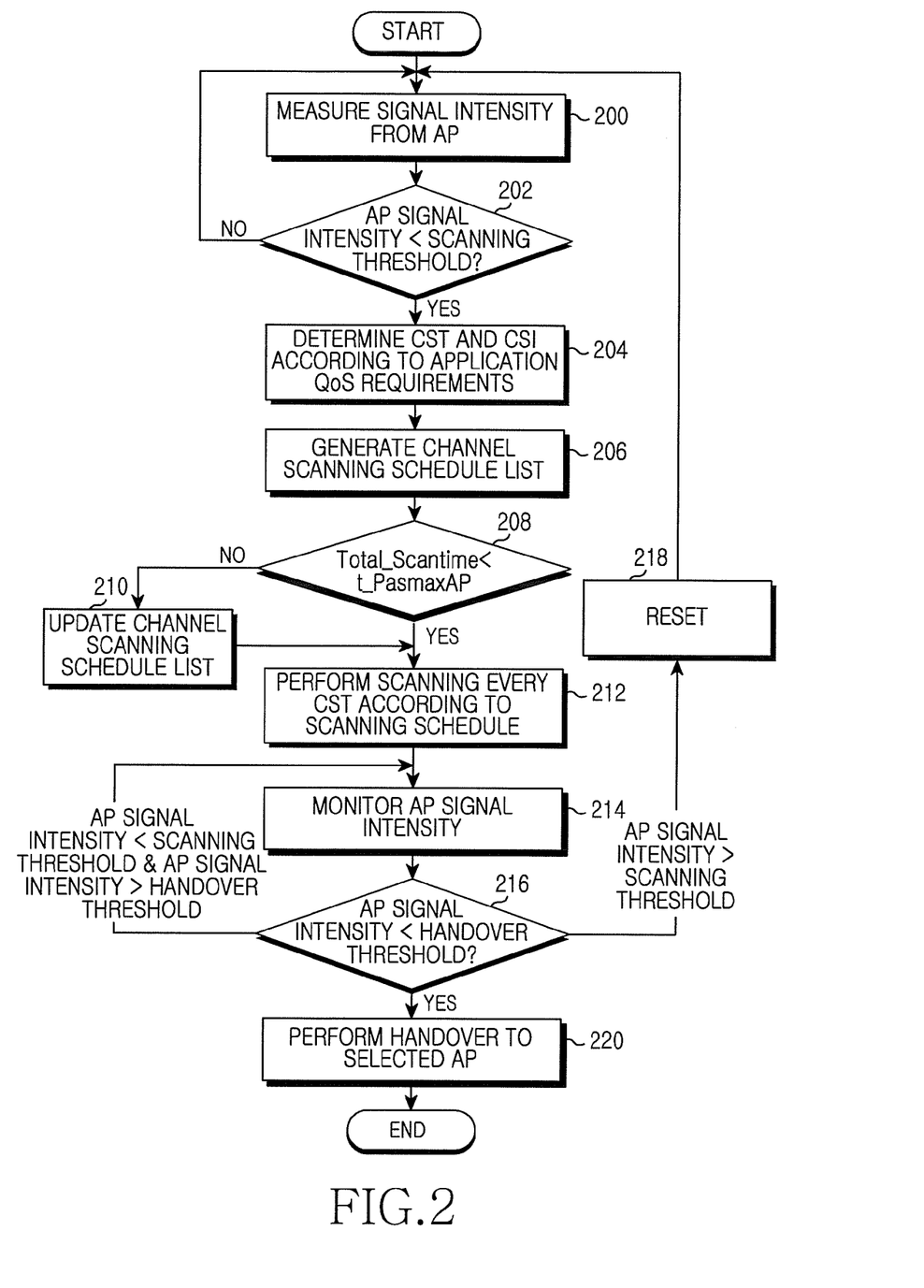
FIG. 2 illustrates a process in which, upon receiving real-time service, a wireless Mobile Station (MS) performs channel scanning for handover in a wireless communication system according to an embodiment of the present invention.

The present invention is composed of setting a CST according to the QoS requirements, composing an AP schedule list, and performing AP channel scanning. FIG. 2 illustrates the whole process of performing channel scanning for handover when receiving an IPTV real-time service according to the present invention. To preferentially separate a channel scanning process and a handover process, an MS stores a scanning threshold (Scan_Thresh) and a Handover threshold (HO_Thresh). When a signal intensity that an MS receives from a currently connected AP is less than a preset scanning threshold (Scan_Thresh), the MS performs channel scanning.

FIG. 2 illustrates a process in which, upon receiving a real-time service, a wireless MS performs channel scanning for handover in a wireless communication system according to an embodiment of the present invention.

Referring to FIG. 2, in block 200, the wireless MS measures a signal intensity from a serving AP. In block 202, the wireless MS compares the serving AP signal intensity with a scanning threshold.

If the AP signal intensity is equal to or greater than the scanning threshold in block 202, the wireless MS returns to block 200. In contrast, when the AP signal intensity is less than the scanning threshold in block 202, the wireless MS proceeds to block 204 and determines a CST and a CSI based on the QoS requirements of an application. The CSI is a time duration between a first CST and a second CST (e.g. between successive CSTs), and is a duration for which the wireless MS transmits packet data. The CST is a duration for which the wireless MS performs channel scanning.

For example, in a mobile IPTV multimedia service, the CST is determined using a data amount ($S_{buf}$) stored in a buffer of the wireless MS and a replay rate ($R_{play}$). The CST and the CSI are determined by Equation 1 below.

$$CST = \frac{S_{buf}}{R_{play}} \quad \text{[Eqn. 1]}$$

$$CSI = \frac{R_{play}}{F(t)}$$

Here, the 'F(t)' is an amount of data packets received from an MS buffer during a unit of time, and is a value that may change depending on a network state. The replay rate ($R_{play}$) maintains a constant value. In a service that is sensitive to a delay time such as a mobile IPTV Voice over Internet Protocol (VoIP) and video conference service, less delay time is set, and the delay time may be set to less than '50 ms' (e.g., the maximum delay time for ensuring a QoS of a widely used VoIP application).

In block 206, the wireless MS composes an AP channel scanning schedule list, based on corresponding information. That is, the wireless MS does channel scheduling to minimize total channel scan time. Here, the wireless MS checks a previous handover history or receives the previous handover history from an information server such as a Media Independent Handover (MIH) server and such, thereby being capable of acquiring data on a channel number in which an AP operates and a time point when a beacon is transmitted.

The composing (e.g. generating) of the AP channel scanning schedule list is further described with reference to FIG. 3.

In block 208, when a total channel scan time (total_scantime) is less than a maximum t_pas value (t_pas$_{max}$AP) of the AP channel scanning schedule list in block 208, the wireless MS proceeds to block 212.

If the total channel scan time (total_scantime) is greater than or equal to the maximum t_pas value (t_pas$_{max}$AP) of the AP channel scanning schedule list, the wireless MS proceeds to block 210 and updates the AP channel scanning schedule list. Here, the 't_pas' is a time duration for scanning an AP channel in a passive scan scheme. The updating of the AP channel scanning schedule list is further described with reference to FIG. 4.

In block 212, the wireless MS performs channel scanning every CST, based on the CST/CSI and the AP channel scanning schedule list.

When the CST is less than the total channel scan time (total_scantime), the CST is scheduled and divided into individual Scanning Units (SU) such that channel scanning can be performed within the CST. In a WLAN wireless MS, an SU is determined according to a scan scheme. 'T_SU' is a time duration for determining each channel scanning unit, and is equal to an AP scan time (sc_time) value previously stored by AP.

The wireless MS determines how many times the SU has to be implemented for each CST, in Equation 2 below.

$$N_{maxscan} = \quad \text{[Eqn. 2]}$$
$$\text{Max}(n) \text{ s.t. } \sum_{i=k}^{n} T\_SU_i \leq CST (1 \leq k \leq N_{AP}, k \leq n \leq N_{AP})$$

Max(n) is the maximum integer that satisfies $$\sum_{i=k}^{n} T\_SU_i \leq CST.$$

That is during a CST, the wireless MS performs channel scanning for $N_{maxscan}$ number of APs stored in the AP channel scanning schedule list. After the wireless MS performs SUs of the first number ($N_{maxscan}$), the wireless MS stops channel scanning during the CSI after the first CST and then, during a second CST, performs channel scanning for the remaining APs. Time to perform next scanning is changed from the '$T_{next}$' to '$T_{next}$ $T_{sw}$+CST+CSI', and a schedule for the remaining APs according to this is regenerated. If the number of wireless MSs connecting to one AP increases, a success rate of AP channel scanning can decrease due to a delay of a beacon transmission time of a passive scan scheme and a collision between probe messages of an active scan scheme. When an AP cannot be scanned within a scheduled time, the above procedure is repeated until scanning for all APs stored in the AP channel scanning schedule list is completed.

After the channel scanning is completed, an adjacent AP list for handover target AP selection is generated in order of high reception signal strength.

In block 214, the wireless MS monitors the signal intensity of the serving AP and, in block 216, compares the signal intensity of the serving AP with the handover threshold.

When the signal intensity of the serving AP is less than the handover threshold in block 216, the wireless MS proceeds to block 220 and selects, in the adjacent AP list, an AP of the best signal intensity as a target AP and performs handover.

In contrast, when the serving AP signal intensity is greater than the scanning threshold in block 216, the wireless MS proceeds to block 218 and performs reset and then, returns to block 200. When the serving AP signal intensity is less than the scanning threshold and is greater than the handover threshold (i.e., scanning threshold>serving AP signal intensity>handover threshold) in block 216, the wireless MS returns to block 214.

Next, the wireless MS performs an authentication and recombination procedure.

Figure 3A:
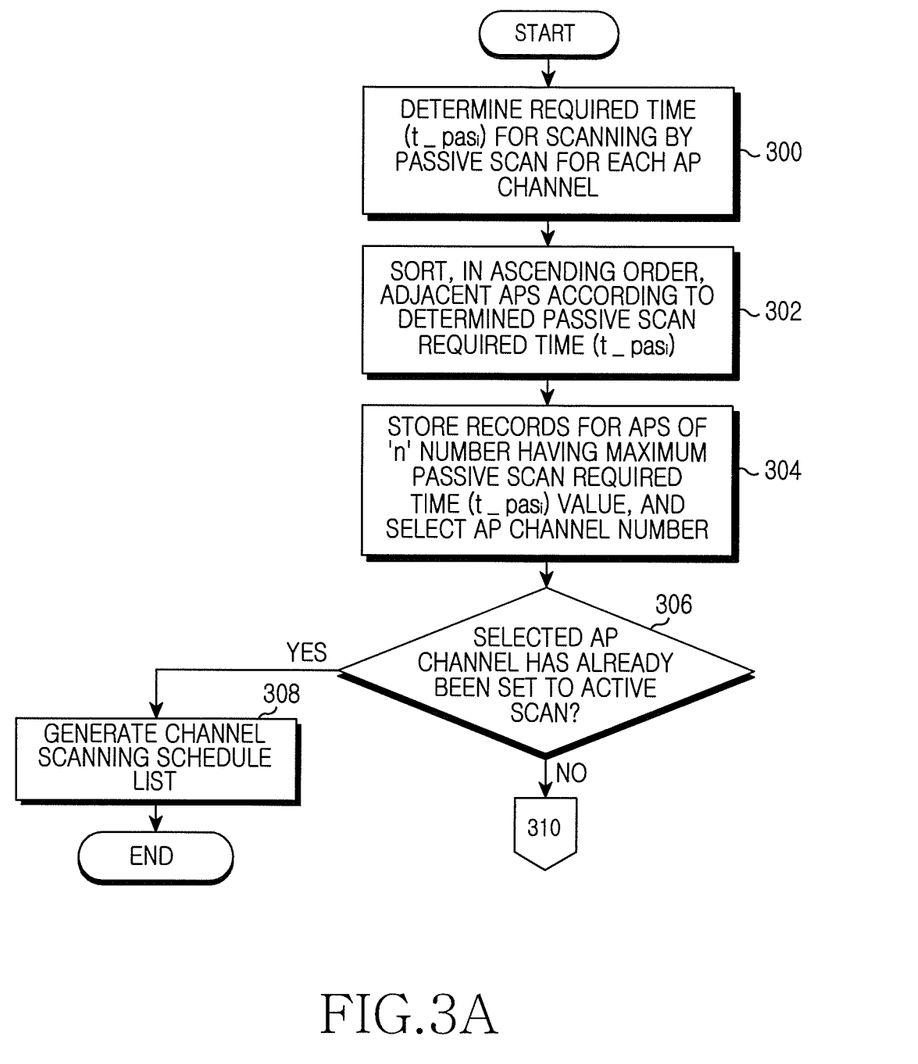
FIGS. 3A-3B illustrate a process for composing an Access Point (AP) channel scanning schedule list according to an embodiment of the present invention.
Figure 3B:
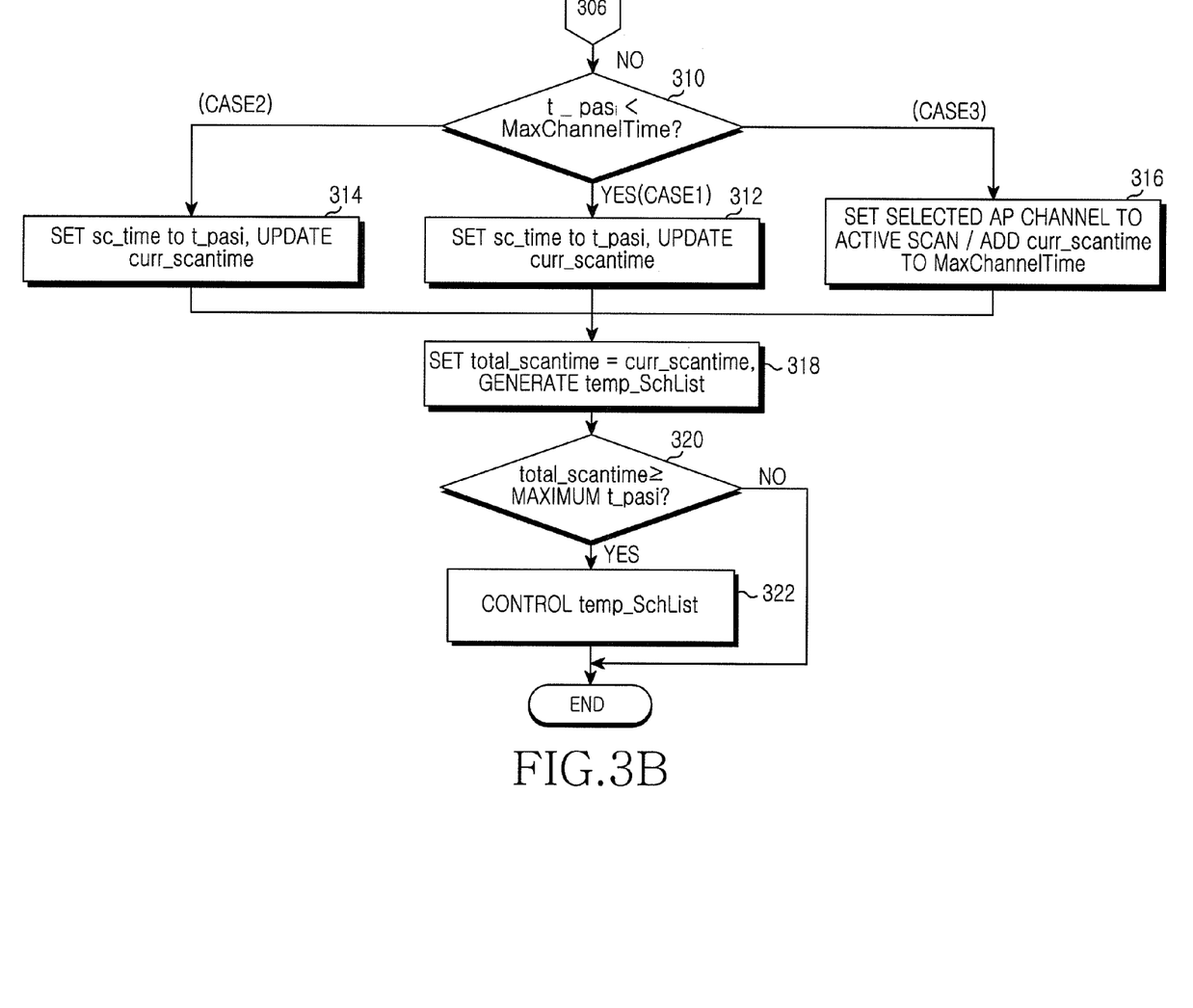

FIGS. 3A-3B illustrate a process for composing an AP channel scanning schedule list according to an embodiment of the present invention.

Referring to FIGS. 3A-3B, in block 300, a wireless MS determines an expected time (t_pasi) for scanning in a passive scan scheme for each AP in Equation 3 below. Here, the 'i' in 't_pasi' is an AP identifier.

$$t\_pas = T_{wait\_bcon} - T_{sw}, \text{ if } T_{wait\_bcon} > T_{sw}$$

$$T_{wait\_bcon} + \tau_p - T_{sw}, \text{ if } T_{wait\_bcon} < T_{sw} \quad \text{[Eqn. 3]}$$

Here, the '$T_{wait\_bcon}$' is a time duration until a beacon of each AP is received at a next channel scanning time point ($T_{next}$). The '$T_{sw}$' is a channel switching time, and the '$\tau_p$' is a beacon signal period.

The '$T_{wait\_bcon}$' is defined by Equation 4 below.

$$T_{wait\_bcon} = \left(T_{prevbcon} + \tau_p \cdot \left\lceil \frac{T_{next}}{\tau_p} \right\rceil - T_{next}\right) \bmod \tau_p \quad \text{[Eqn. 4]}$$

Here, the '$T_{prevbcon}$' is a beacon reception time point at previous handover.

Alternatively, the wireless MS stores, in a table, a beacon reception time, an AP address, and a channel number by AP.

In block 302, the wireless MS sorts, in ascending order, adjacent APs according to the passive scan time (t_pasi) values by AP channel recorded in the table.

In block 304, the wireless MS stores, in a separate table, records for APs of 'n' number that include a maximum passive scan time (t_pas) within the table, and selects an AP channel number.

In block 306, the wireless MS determines whether the selected AP channel has already been set to active scan. That is, the wireless MS identifies whether AP channels included in an AP channel scanning schedule list have already been set to the active scan, respectively.

If the selected AP channel has been set to the active scan in block 306, in block 308, the wireless MS records the selected AP channel as 'scan time=0', marks the selected AP channel as the active scan, and generates an AP channel scanning schedule list.

If the selected AP channel has not been set to the active scan in block 306, the wireless MS operates as one of Case 1, Case 2, and Case 3 (blocks 312, 314, and 316).

In block 310, the wireless MS determines whether the passive scan time (t_pasi) of the selected AP is less than a maximum wait time (MaxChannelTime) of the active scan (i.e., t_pasi<MaxChannelTime). If so, the wireless MS operates under Case 1. In Case 1 (block 312), in other words, when the passive scan time (t_pasi) of the selected AP is less than a maximum wait time (MaxChannelTime) of the active scan (i.e., t_pasi<MaxChannelTime), the wireless MS sets an AP scan time (sc_time) to the passive scan time (t_pasi), and updates a sum of current scan time for previous APs (curr_scantime) in the AP channel scanning schedule list.

In Case 2 (block 314), in other words, when the passive scan time (t_pasi) of the AP is less than a maximum wait time (MaxChannelTime) of the active scan after the last calculated current scan time (curr_scantime) for (i-1)$^{th}$ AP (i.e., curr_scantime–t_pasi<MaxChannelTime), the wireless MS sets the i$^{th}$ AP to passive scan, sets an AP scan time (sc_time) to the passive scan time (t_pasi), and updates the current scan time (curr_scantime) by a total delay time value up to a current AP.

In Case 3 (block 316), the wireless MS sets the selected AP channel to the active scan. At this time, when the selected AP channel has been already set to the active scan by a different AP with the same channel number, a scan time (sc_time) for a corresponding AP is disregarded. So, the wireless MS sets the AP scan time (sc_time) to '0' and does not reflect the AP scan time (sc_time) in determining a total channel scan time (total_scantime). When the selected AP channel has not already been set to the active scan, the wireless MS sets the AP scan time (sc_time) to a maximum wait time (MaxChannelTime), and reflects the maximum wait time (MaxChannelTime) in the current scan time (curr_scantime).

In other words, the 'curr_scantime' is a variable for storing a current scan time. After sorting the adjacent APs, the present invention determines whether the each adjacent APs correspond to any one of Cases 1, 2, and 3. When a previous APi-APx operating on the same channel as a current APi has been already marked as active scan, all APs operating on the same channel are classified as the active scan. At this time, the 'AN' is collectively processed by the active scan, so the scan time is processed by '0'. When the 'APi-x' does not exist, the 'APi' sets a scan time to a maximum wait time and reflects the maximum wait time in the current scan time (curr_scantime).

In block 318, the wireless MS sets 'total_scantime=curr_scantime', and generates a temporary schedule list (temp_SchList).

In block 320, the wireless MS determines whether total_scantime≥maximum t_pasi. If total_scantime≥maximum t_pasi, the wireless MS controls the temporary schedule list (temp_SchList) in block 320.

In contrast, if total_scantime<maximum t_pasi in block 320, the wireless MS terminates the AP channel scanning schedule list composition.

Figure 4:
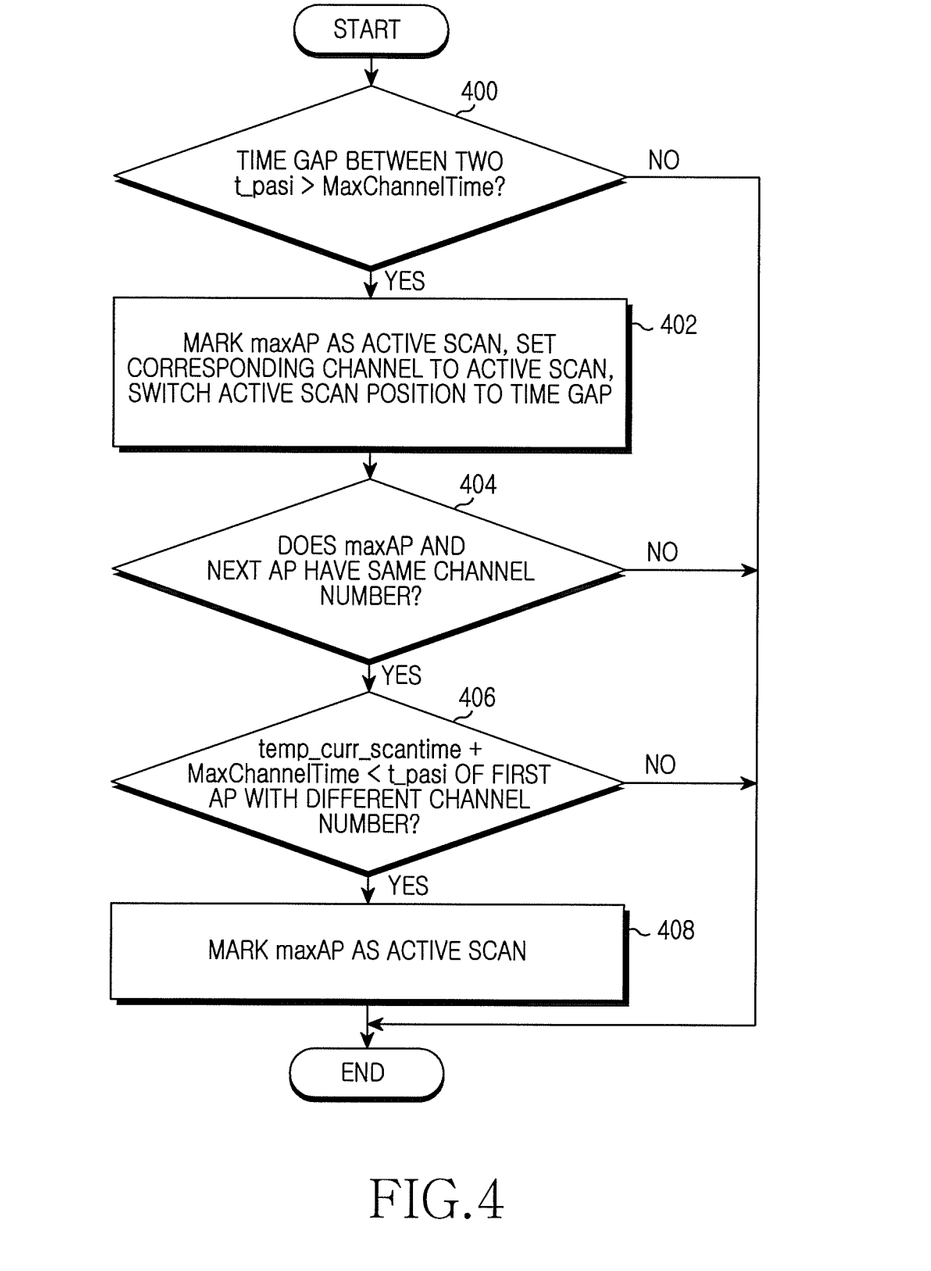
FIG. 4 illustrates a process for composing a temporary schedule list according to an embodiment of the present invention.

FIG. 4 illustrates a process for composing a temporary schedule list according to an embodiment of the present invention.

In FIG. 4, the temporary schedule list (temp_SchList) is controlled when total_scantime≥maximum t_pasi.

In block 400, regarding all APs included in the temp_SchList or all APs included in an AP channel scanning schedule list, the wireless MS determines whether a time gap between passive scan time (t_pasi) values of two APs is greater than a maximum wait time (MaxChannelTime).

In block 402, the wireless MS marks an AP (maxAP) with a maximum t_pas value as active scan, resets an AP that is set as the maxAP by each time gap to the active scan, and converts an active scan position into the time gap. That is, by applying an active scan scheme to the AP set to the maxAP using the time gap, the wireless MS can reduce a total AP channel scan time.

Next, when a next AP after the AP of the adjusted order of scanning has the same channel number as the AP currently set as the maxAP in block 404, the wireless MS proceeds to block 406 and determines whether Equation 5, below, is met. If met, the wireless MS proceeds to block 408 and resets the maxAP to the active scan.

$$\text{temp}_{curr\_scantime} + \text{MaxChannel Time} < t\_pas \text{ value of first } AP \text{ w/diff. channel number} \quad \text{[Eqn. 5]}$$

As described above, the wireless MS can compose a temporary schedule list with the total channel scan time by adjusting a maxAP of passive scan to an AP of active scan through temporary schedule list composition.

Figure 5:
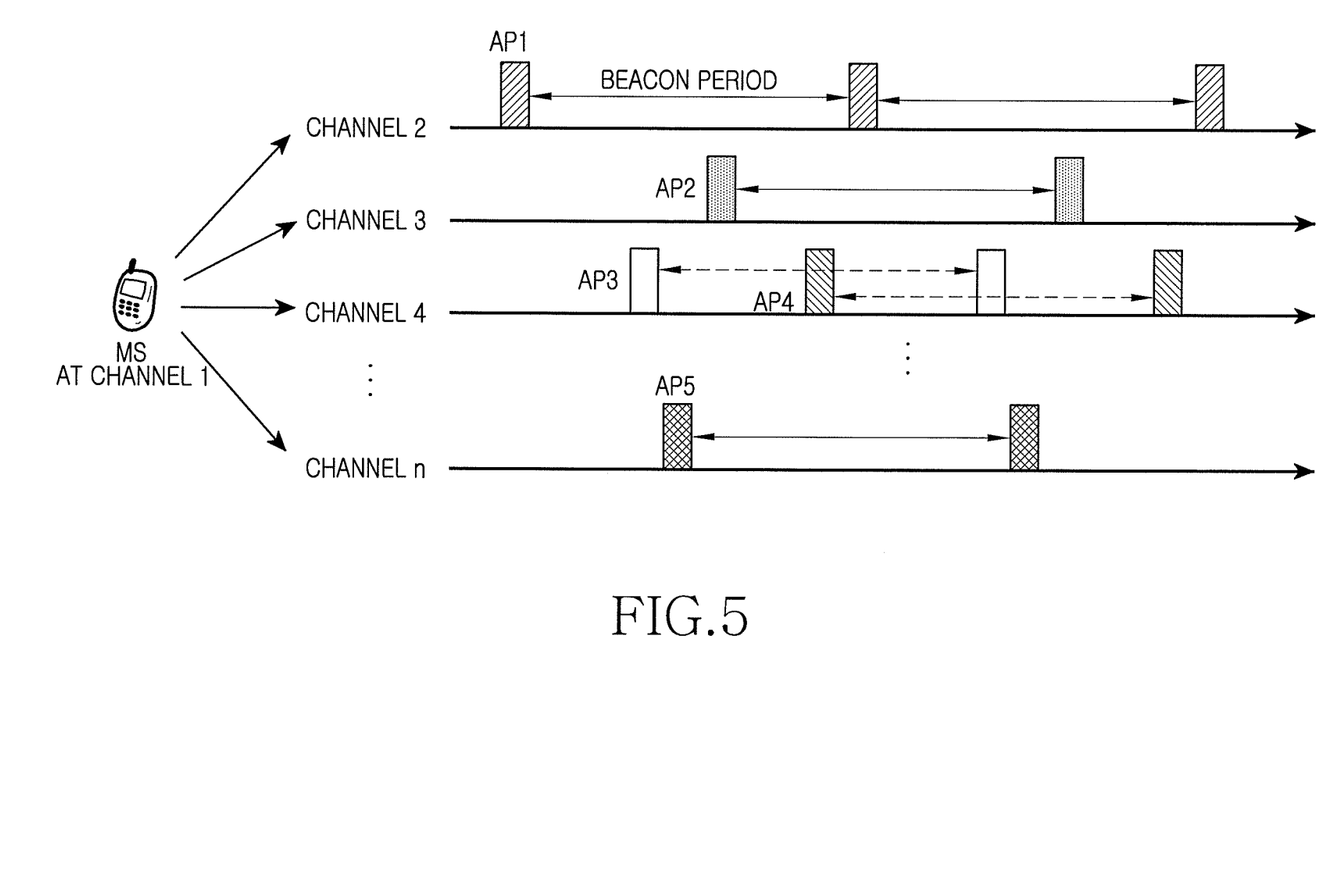
FIG. 5 is a diagram illustrating passive channel scanning in a wireless communication system according to an embodiment of the present invention.

FIG. 5 is a diagram illustrating passive channel scanning in a wireless communication system according to the present invention.

Referring to FIG. 5, a wireless MS is being serviced through an AP channel 1 and, to do handover, the wireless MS performs channel scanning for an AP channel 2 to an AP channel n.

To perform passive scan, the wireless MS temporarily stops connecting with the AP channel 1 and switches to all other channels (i.e., the AP channel 2 to the AP channel n) supported in a WLAN system. An AP that is in operation on each channel broadcasts a beacon signal at constant periods, and the wireless MS waits until all beacon signals of an AP operating in the respective channel are received. Alternatively, a plurality of APs on one AP channel (e.g., the AP channel 4) may broadcast beacon signals.

Figure 6:
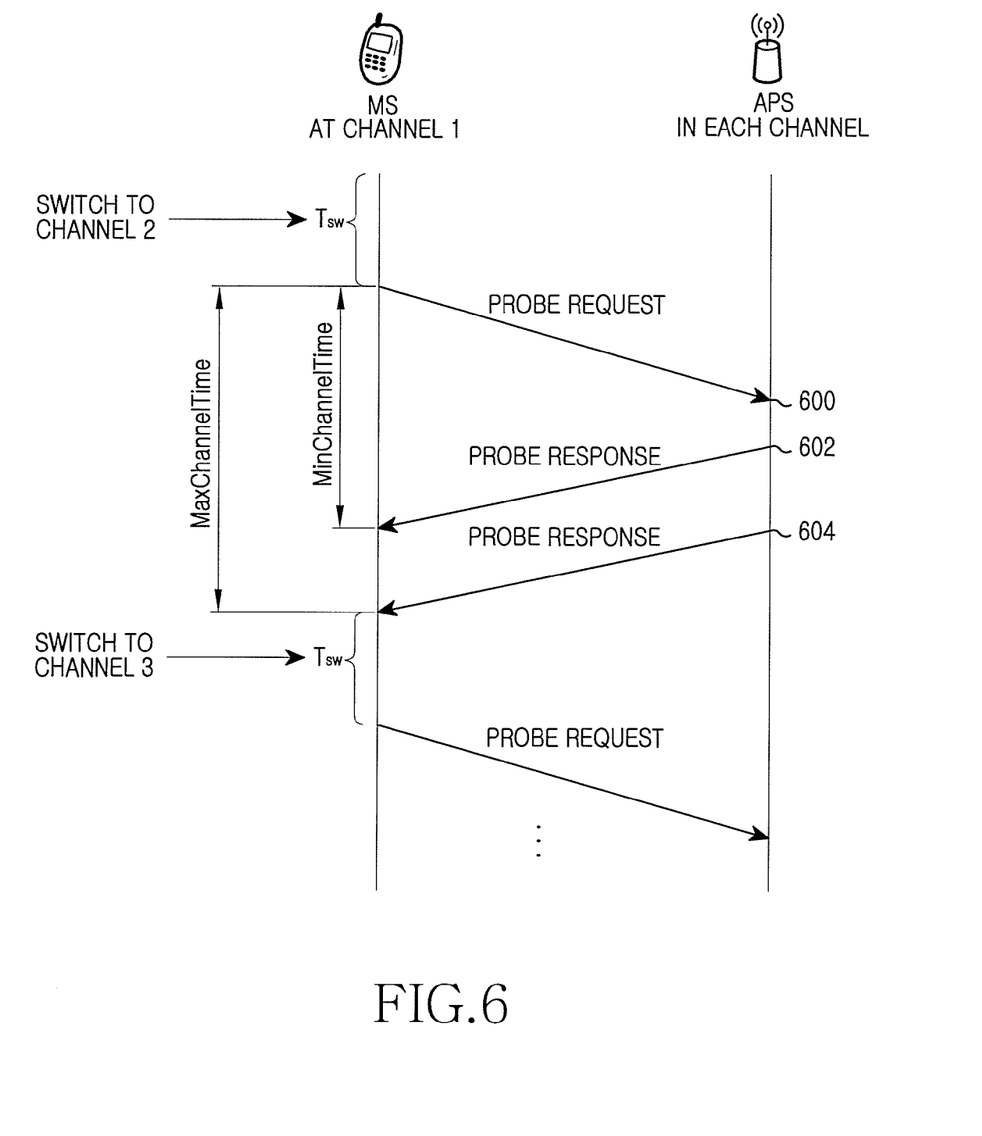
FIG. 6 is a diagram illustrating active channel scanning in a wireless communication system according to an embodiment of the present invention.

FIG. 6 is a diagram illustrating active channel scanning in a wireless communication system according to an embodiment of the present invention.

Referring to FIG. 6, during an active scan, like passive scan, after temporarily stopping connecting with an AP channel 1, a wireless MS accesses each channel, and sends a probe request message (step 600). After setting a channel wait timer to a minimum wait time (MinChannelTime) by each AP channel, the wireless MS waits to receive a probe response message from the other party AP (step 602). If the probe response message is received within the minimum wait time, after resetting the channel wait timer to a maximum wait time (MaxChannelTime), the wireless MS waits to receive an additional probe response message from a different AP of a corresponding channel (step 604).

Figure 7:
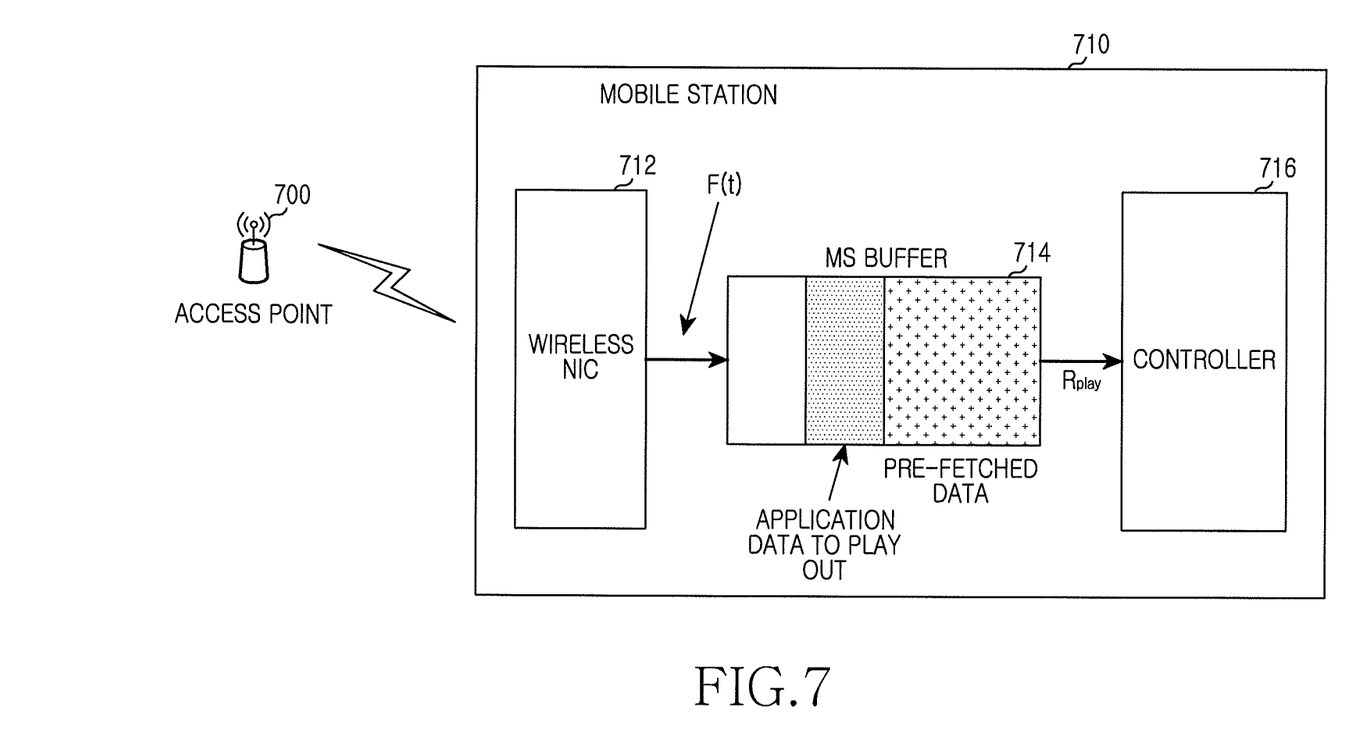
FIG. 7 is a block diagram of a wireless MS that performs channel scanning in a wireless communication system according to an embodiment of the present invention.

FIG. 7 is a block diagram of a wireless MS that performs channel scanning in a wireless communication system according to an embodiment of the present invention.

Referring to FIG. 7, the wireless MS 710 includes a wireless Network Interface Card (NIC) 712, a buffer 714, and a controller 716.

The wireless MC 712 performs the role of an interface connecting an AP 700 with the wireless MS 710. That is, the wireless NIC 712 is installed in the wireless MS 710, and transmits packet data of the wireless MS 710 to the AP 700 according to the IEEE 802.11 standard and also receives packet data from the AP 700 and provides the packet data to the wireless MS 710. Also, the wireless NIC 712 measures a signal intensity from a serving AP and provides the signal intensity to the controller 716.

The buffer 714 performs buffering between the wireless NIC 712 and the controller 716, each having a different processing speed, and provides packet data from the wireless NIC 712 to the controller 716 or from the controller 716 to the wireless NIC 712. That is, the buffer 714 can allow each device or processor to work without being stopped by the other party.

The controller 716 assumes general control of the wireless MS 710. In an embodiment of the present invention, the controller 716 determines a scan time based on a channel scan scheme (i.e., a passive scan scheme or an active scan scheme) and updates an AP channel scanning schedule list to minimize the scan time.

When a signal intensity of the AP 700 is less than a scanning threshold, the controller 716 determines a CSI and a CST based on the QoS requirements of an application through Equation 1, above, and composes an AP channel scanning schedule list based on the corresponding information. That is, the wireless MS 710 performs channel scheduling to have a minimum total channel scan time among adjacent AP channel scan times. In an embodiment, the wireless MS may acquire data on a channel number in which each AP operates and a time point at which a beacon is transmitted by determining a previous handover history or receiving the previous handover history from an information server such as an MIH server (not shown).

The controller 716 performs channel scanning every CST, based on the CST/CSI and the AP channel scanning schedule list. When the signal intensity of the serving AP is less than a handover threshold, the controller 716 selects, among the adjacent AP list, an AP of the best signal intensity as a target AP and performs handover.

Figure 8:
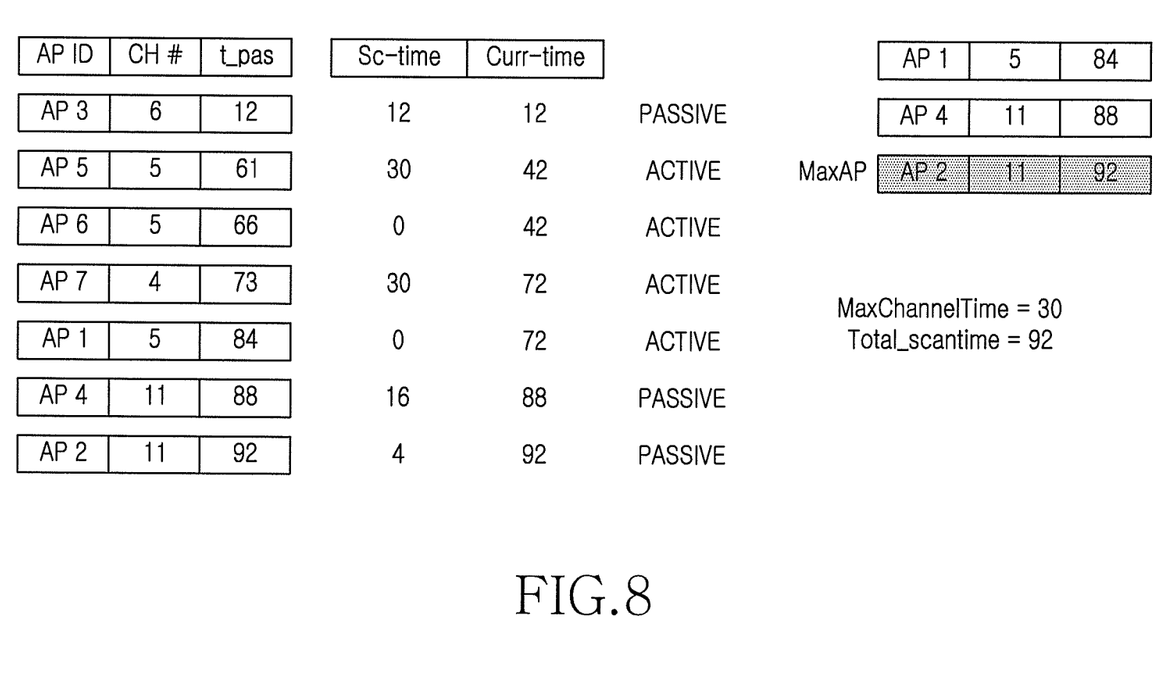
FIG. 8 illustrates an example of composing a channel scanning schedule list according to an embodiment of the present invention.

FIG. 8 illustrates an example of composing a channel scanning schedule list according to an embodiment of the present invention. Although seven APs are used in this example, this is not meant to limit the scope of the invention as more or less APs may be included when composing a channel scanning schedule list.

Referring to FIG. 8, AP1 to AP7 are sorted according to a passive scan time (t_pas) value. In the passive scan AP3, 'sc_time' is equal to 12 and 'curr_time' is equal to 12. In the active scan AP5, 'sc_time' is equal to 30 and 'curr_time' is equal to 42. In the active scan AP6, 'sc_time' is equal to 0 and 'curr_time' is equal to 42. In the active scan AP7, 'sc_time' is equal to 30 and 'curr_time' is equal to 72. In the active scan AP1, 'sc_time' is equal to 0 and 'curr_time' is equal to 72. In the passive scan AP4, 'sc_time' is equal to 16 and 'curr_time' is equal to 88. In the passive scan AP2, 'sc_time' is equal to 4 and 'curr_time' is equal to 92. Lastly, MaxChannelTime=30, and total_scantime=92. Here, a maxAP is an AP2.

Figure 9:
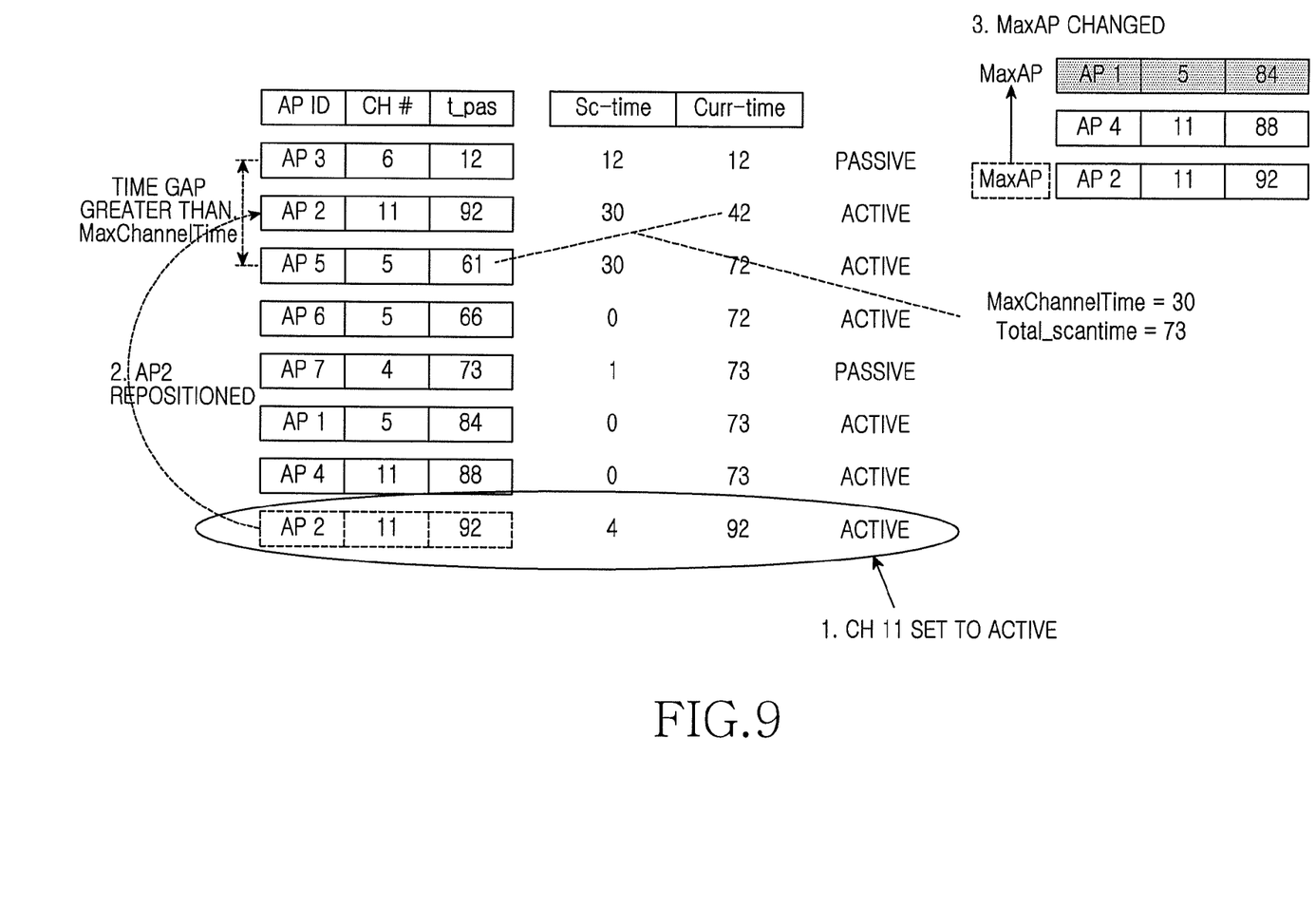
FIG. 9 illustrates an example of composing a temporary schedule list according to an embodiment of the present invention.

FIG. 9 illustrates an example of composing a temporary schedule list according to an embodiment of the present invention.

Referring to FIG. 9, after the AP2 of the channel scanning schedule list of FIG. 8 is switched to active scan, the maxAP is changed into the AP4. Because the AP4 uses the same channel number '11' as the AP2, the AP4 is automatically set to the active scan, and the maxAP is changed into the AP1.

Then, sc_time of AP2 is changed into 30 (MaxChannelTime), because a channel scanning of AP2 is changed into an active scan, and a curr_scantime of AP2 is set 42 (30+12(a curr_scantime of AP3)). When a next AP has the same channel number as the maxAP, the AP7 is set to passive scan when curr_scantime of AP7+MaxChannelTime<t_pasi of AP7 with different channel number (e.g., AP7). Because '73 ms−42 ms=31 ms' is greater than a maximum wait time (Maxchanneltime), the AP5 is marked as the active scan. After all schedules are composed, a total channel scan time (total_scantime) value is reduced to '73'.

As described above, an efficient AP channel scanning technique for WLAN based real-time streaming according to the present invention has several advantages compared to the conventional technology.

For example, a channel scanning scheduling technique according to the present invention may effectively reduce a channel scanning delay time by considering the optimal combination of passive scan and active scan. Because a real-time mobile IPTV service is received through a reduction of a channel scanning delay time, users can perform handover while being ensured in QoS.

Furthermore, because an MS separately performs a channel scan and an actual handover and performs the channel scan alternately with real-time data transmission, prompt handover is possible. Because a wireless MS previously generates a handover AP list through channel scanning during each CST, when actual handover occurs, the wireless MS omits the channel scan and enables a prompt authentication and recombination procedure for a target AP.

Moreover, compared to using only passive scan, a channel scanning mechanism provided in the present invention relatively reduces the number of probe request messages that an MS sends for channel scanning and the number of probe response messages that an AP sends as responses. As such, a channel traffic load phenomenon resulting from the above message exchange and a collision between the messages decrease, thereby providing improved performance in channel scanning success rate and handover success rate.

As described above, embodiments of the present invention can advantageously reduce a channel scanning delay time by determining a scan time for each AP channel and selecting a scan scheme in a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method in a wireless mobile station (MS) for channel scanning in a wireless communication system, the method comprising:
    comparing a signal intensity of a serving Access Point (AP) with a scanning threshold;
    when the serving AP signal intensity is less than the scanning threshold, generating a channel scanning schedule list using a scan time based on a passive channel scan scheme and a scan time based on an active channel scan scheme; and
    performing the channel scanning every channel scanning time, according to the channel scanning schedule list.

2. The method of claim 1, further comprising:
    after performing the channel scanning, monitoring the serving AP signal intensity; and
    determining whether to perform a handover based on the comparison between the monitored AP signal intensity and a handover threshold.

3. The method of claim 1, wherein generating the channel scanning schedule list comprises:
    determining a scan time (t_pas) for each AP in each channel based on the passive channel scan scheme;
    sorting, in ascending order, the t_pas and mapping each t_pas to a corresponding AP and at least one of a corresponding channel, a beacon reception time, and a corresponding AP address;
    comparing, for each AP on the channel scanning schedule list by the sorted order, the t_pas with a maximum wait time (MaxChannelTime) by channel of a Mobile Station (MS) based on the active channel scan scheme, and determining a scan scheme for the corresponding channel;
    comparing a total channel scan time (total_scantime) based on the determined scan scheme for each AP with a maximum scan time (t_pasmax) based on the passive channel scan scheme; and
    if the total_scantime is greater than the t_pasmax, updating the channel scanning schedule list.

4. The method of claim 3, wherein the t_pas for each AP is determined according to the equation below:

$$t\_pas = T_{wait\_bcon} - T_{sw}, \text{ if } T_{wait\_bcon} > T_{sw}$$

$$T_{wait\_bcon} + \tau_p - T_{sw}, \text{ if } T_{wait\_bcon} < T_{sw}$$

wherein:
    $T_{wait\_bcon}$ denotes a time until receiving a beacon from each AP at next channel scanning time point ($T_{next}$),
    $T_{sw}$ denotes a channel switching time,
    $\tau_p$ denotes a beacon signal period, and
    $T_{wait\_bcon}$ is defined by the equation below:

$$T_{wait\_bcon} = \left( T_{prevbcon} + \tau_p \cdot \left\lceil \frac{T_{next}}{\tau_p} \right\rceil - T_{next} \right) \mathrm{mod}\, \tau_p$$

wherein $T_{prevbcon}$ denotes beacon reception time point at a previous handover.

5. The method of claim 3, wherein, when a Channel Scanning Time (CST) is less than the total_scantime, a scanning duration is divided into individual Scanning Units (SUs) that can be performed within the CST.

6. The method of claim 5, wherein the number of SUs is determined every CST according to the equation below:

$$N_{maxscan} = \mathrm{Max}(n) \text{ s.t. } \sum_{i=k}^{n} T\_SU_i \leq CST (1 \leq k \leq N_{AP}, k \leq n \leq N_{AP})$$

wherein Max(n) is a maximum integer that satisfies $$\sum_{i=k}^{n} T\_SU_i \leq CST,$$

and T_SU is a time duration for determining each SU.

7. The method of claim 3, wherein updating the channel scanning schedule list comprises:
    determining whether a time gap between a first t_pas and a second t_pas in the channel scanning schedule list is greater than the MaxChannelTime; and
    when the time gap is greater than the MaxChannelTime, changing a channel scan scheme of the corresponding channel of an AP that corresponds to the t_pasmax to the active channel scan scheme.

8. The method of claim 7, further comprising, when the time gap is greater than the MaxChannelTime, moving the AP that corresponds to the t_pasmax to a position between a first AP that corresponds to the first t_pas and a second AP that corresponds to the second t_pas in the channel scanning schedule list.

9. The method of claim 1, further comprising setting a Channel Scanning Time (CST) and a Channel Scanning Interval (CSI) based on a Quality of Service (QoS) of packet data being transmitted.

10. The method of claim 9, wherein the CST and CSI are determined according to the equation below:

$$CST = \frac{S_{buf}}{R_{play}}$$

$$CSI = \frac{R_{play}}{F(t)}$$

wherein:
    $S_{buf}$ denotes a data amount stored in a buffer of the wireless MS,
    $R_{play}$ denotes a replay rate, and
    $F(t)$ denotes an amount of data packets received from the buffer during a unit time of time.

11. The method of claim 3, wherein comparing, for each AP, the t_pas with the MaxChannelTime and determining the scan scheme by channel comprises:
when the t_pas is less than the MaxChannelTime, updating a current scan time (curr_scantime) to the t_pas and setting the scan scheme to the passive channel scan scheme;
when a difference between a last updated curr_scantime and the t_pas is less than the MaxChannelTime, updating the curr_scantime to the t_pas and setting the scan scheme to the passive channel scan scheme; and
when the t_pas is not less than the MaxChannelTime and the difference between the last updated curr_scantime and the t_pas is not less than the MaxChannelTime, setting the scan scheme to the active channel scan scheme, and
wherein setting the scan scheme to the active channel scan scheme comprises:
when the corresponding channel for the serving AP has been set to the active channel scan scheme by a different AP, setting a time (sc_time) for performing the channel scanning for the serving AP to '0', and
when the corresponding channel for the serving AP has not been set to the active channel scan scheme by the different AP, setting the sc_time to the MaxChannelTime, and updating the curr_scantime by adding the set MaxChannelTime to the last updated curr_scantime.

12. An apparatus in a wireless mobile station (MS) for channel scanning in a wireless communication system, the apparatus comprising:
a wireless Network Interface Card (NIC) configured to compare a signal intensity of a serving Access Point (AP) with a scanning threshold and performing the channel scanning; and
a controller configured to, when the serving AP signal intensity is less than the scanning threshold, generate a channel scanning schedule list using a scan time based on a passive channel scan scheme and a scan time based on an active channel scan scheme, and performing channel scanning every channel scanning time according to the channel scanning schedule list.

13. The apparatus of claim 12, wherein, after performing the channel scanning, the controller is further configured to:
monitor the serving AP signal intensity; and
determine whether to perform a handover based on the comparison between the monitored serving AP signal intensity and a handover threshold.

14. The apparatus of claim 12, wherein the controller is further configured to:
determine a scan time (t_pas) for each AP in each channel based on the passive channel scan scheme,
sort, in ascending order, the t_pas for each AP and map, each t_pas to a corresponding AP and at least one of a corresponding channel, a beacon reception time, and a corresponding AP address,
compare, for each AP on the channel scanning schedule list by the sorted order, the t_pas with a maximum wait time (MaxChannelTime) by channel of a Mobile Station (MS) based on the active channel scan scheme, and determine a scan scheme for the corresponding channel, and
compare a total channel scan time (total_scantime) based on the determined scan scheme for each AP with a maximum scan time (t_pasmax) based on the passive channel scan scheme, and update the channel scanning schedule list.

15. The apparatus of claim 14, wherein the t_pas for each AP is determined according to the equation below:

$$t\_pas = T_{wait\_bcon} - T_{sw}, \text{ if } T_{wait\_bcon} > T_{sw}$$

$$T_{wait\_bcon} + \tau_p - T_{sw}, \text{ if } T_{wait\_bcon} < T_{sw}$$

wherein:
$T_{wait\_bcon}$ denotes a time until receiving a beacon from each AP at next channel scanning time point ($T_{next}$),
$T_{sw}$ denotes a channel switching time,
$\tau_p$ denotes a beacon signal period, and
$T_{wait\_bcon}$ is defined by the equation below:

$$T_{wait\_bcon} = \left( T_{prevbcon} + \tau_p \cdot \left\lceil \frac{T_{next}}{\tau_p} \right\rceil - T_{next} \right) \bmod \tau_p$$

wherein $T_{prevbcon}$ denotes beacon reception time point at a previous handover.

16. The apparatus of claim 15, wherein, when a Channel Scanning Time (CST) is less than the total_scantime, a scanning duration is divided into individual Scanning Units (SUs) that can be performed within the CST.

17. The apparatus of claim 16, wherein the number of SUs is determined every CST according to the equation below:

$$N_{maxscan} = \text{Max}(n) \text{ s.t. } \sum_{i=k}^{n} T\_SU_i \leq CST (1 \leq k \leq N_{AP}, k \leq n \leq N_{AP})$$

wherein Max(n) is a maximum integer that satisfies $$\sum_{i=k}^{n} T\_SU_i \leq CST,$$

and T_SU is a time duration for determining each SU.

18. The apparatus of claim 14, wherein, when updating the channel scanning schedule list, the controller is further configured to:
determine whether a time gap between a first t_pas and a second t_pas in the channel scanning schedule list is greater than the MaxChannelTime, and
when the time gap is greater than the MaxChannelTime, change a channel scan scheme of the corresponding channel of an AP that corresponds to the t_pasmax to the active channel scan scheme.

19. The apparatus of claim 18, wherein when the time gap is greater than the MaxChannelTime, the controller is further configured to move the AP that corresponds to the t_pasmax to a position between a first AP that corresponds to the first t_pas and a second AP that corresponds to the second t_pas in the channel scanning schedule list.

20. The apparatus of claim 12, wherein the controller is further configured to set a Channel Scanning Time (CST) and a Channel Scanning Interval (CSI) based on a Quality of Service (QoS) of packet data being transmitted.

21. The apparatus of claim 20, wherein the CST and CSI are determined according to the equation below:

$$CST = \frac{S_{buf}}{R_{play}}$$

-continued $$CSI = \frac{R_{play}}{F(t)}$$

wherein:
$S_{buf}$ denotes a data amount stored in a buffer of the wireless MS,
$R_{play}$ denotes a replay rate, and
F(t) denotes an amount of data packets received from the buffer during a unit of time.

22. The apparatus of claim 14, wherein when comparing the t_pas with the MaxChannelTime for each AP and determining the scan scheme by channel the controller is further configured to:
when the t_pas is less than the MaxChannelTime, update a current scan time (curr_scantime) to the t_pas and set the scan scheme to the passive channel scan scheme,
when a difference between a last updated curr_scantime and the t_pas is less than the MaxChannelTime, update the curr_scantime to the t_pas and set the scan scheme to the passive channel scan scheme, and
when the t_pas is not less than the MaxChannelTime and the difference between the last updated curr_scantime and the t_pas is not less than the MaxChannelTime, set the scan scheme to the active channel scan scheme,
when the corresponding channel for the serving AP has been set to the active channel scan scheme by a different AP, set a time (sc_time) for performing the channel scanning for the serving AP to '0', and
when the corresponding channel for the serving AP has not been set to the active channel scan scheme by the different AP, set the sc_time to the MaxChannelTime, and update the curr_scantime by adding the set MaxChannelTime to the last updated curr_scantime.

* * * * *